United States Patent
Barile et al.

(10) Patent No.: US 8,752,180 B2
(45) Date of Patent: Jun. 10, 2014

(54) BEHAVIORAL ENGINE FOR IDENTIFYING PATTERNS OF CONFIDENTIAL DATA USE

(75) Inventors: Ian Barile, Mountain View, CA (US); Mario Espinoza, Foster City, CA (US)

(73) Assignee: Symantec Corporation, Mountain View, CA (US)

( * ) Notice: Subject to any disclaimer, the term of this patent is extended or adjusted under 35 U.S.C. 154(b) by 571 days.

(21) Appl. No.: 12/472,339

(22) Filed: May 26, 2009

(65) Prior Publication Data

US 2010/0306850 A1   Dec. 2, 2010

(51) Int. Cl.
*G06F 11/00* (2006.01)

(52) U.S. Cl.
USPC ............... 726/25; 726/11; 713/152; 713/165

(58) Field of Classification Search
CPC ....... G06F 21/50; G06F 21/577; G06F 21/00; G06F 21/41; G06F 21/552; G06F 21/55; G06F 21/554; G06F 21/60; G06F 21/6245

USPC ............... 726/11, 25–26; 713/152, 165
See application file for complete search history.

(56) References Cited

U.S. PATENT DOCUMENTS

| | | | |
|---|---|---|---|
| 7,490,356 B2 * | 2/2009 | Lieblich et al. | 726/25 |
| 7,530,106 B1 * | 5/2009 | Zaitsev et al. | 726/24 |
| 7,647,622 B1 * | 1/2010 | Sobel et al. | 726/1 |
| 7,941,850 B1 * | 5/2011 | Satish | 726/24 |
| 2004/0143753 A1 * | 7/2004 | Hernacki et al. | 713/200 |
| 2005/0160280 A1 * | 7/2005 | Caslin et al. | 713/189 |
| 2008/0289041 A1 * | 11/2008 | Jarvis et al. | 726/24 |
| 2010/0205673 A1 * | 8/2010 | Burrell et al. | 726/25 |
| 2010/0251369 A1 * | 9/2010 | Grant | 726/23 |

* cited by examiner

*Primary Examiner* — Shewaye Gelagay
(74) *Attorney, Agent, or Firm* — Lowenstein Sandler LLP

(57) ABSTRACT

A client device hosts a behavioral engine. Using the behavioral engine, the client device analyzes behavior of a client application with respect to confidential information. The client device assigns a rating indicative of risk to the client application based on the behavior of the client application. The client device performs an action to mitigate risk of data loss if the rating exceeds a threshold.

20 Claims, 4 Drawing Sheets

BEHAVIORAL ENGINE FOR IDENTIFYING PATTERNS OF CONFIDENTIAL DATA USE

FIELD OF INVENTION

Embodiments of the invention relate to malware detection, and more particularly to the detection of malware that operates on confidential information.

BACKGROUND OF THE INVENTION

Traditional antivirus software that uses signatures to detect malware offers limited protection for uncharacterized threats (known as 0-day exploits). Malware is software that is designed to infiltrate or damage a computer system without the informed consent of a user or administrator. Malware includes computer viruses, worms, Trojan horses, rootkits, spyware, adware, crimeware (a class of malware designed to automate financial or political crime), and other dishonest or unwanted software. Such antivirus software typically does not detect or remove malware until a signature for the malware has been written and distributed to the antivirus software. This delay poses a serious threat for computer systems.

Heuristic engines have been developed by antivirus vendors to detect malware without using signatures. However, these heuristic engines examine how potential malware interacts with the operating system on which they operate (e.g., hooking application programming interfaces (APIs), injecting code, modifying registry keys, etc. These heuristic engines analyze the code of the potential malware to determine if the actions that it takes are typical of malware. Conventional antivirus heuristic engines do not have any information regarding whether data contains confidential information, nor do conventional heuristic engines analyze how potential malware behaves with regards to confidential information.

SUMMARY OF THE INVENTION

A client device hosts a behavioral engine. Using the behavioral engine, the client device analyzes behavior of a client application with respect to confidential information. The client device assigns a rating indicative of risk to the client application based on the behavior of the client application. The client device performs an action to mitigate risk of data loss if the rating exceeds a threshold.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
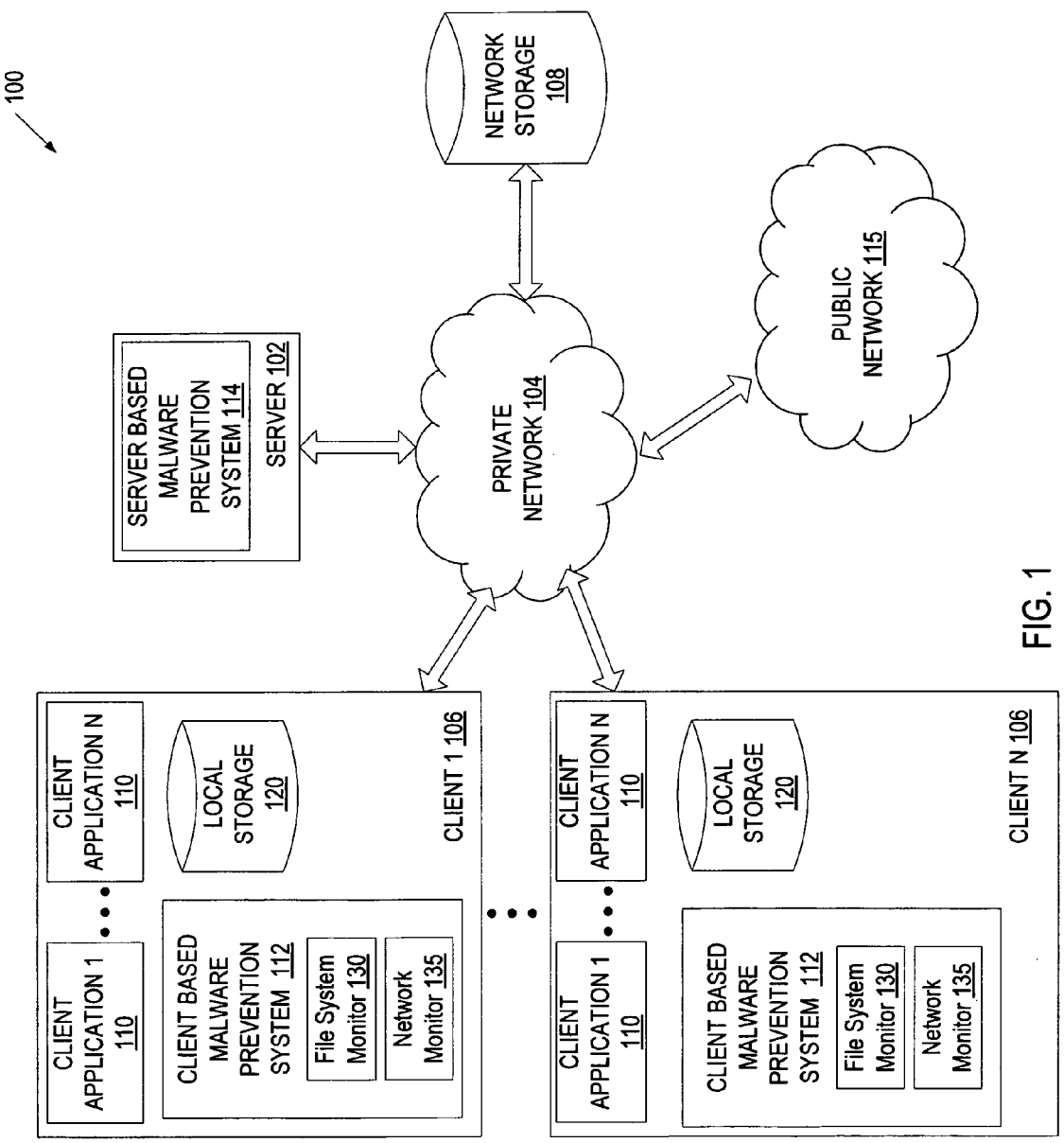
FIG. 1 illustrates an exemplary network architecture in which embodiments of the invention may operate.

A method and apparatus for preventing malware from stealing confidential information is described. In one embodiment, a client device hosts a behavioral engine. Using the behavioral engine, the client device analyzes behavior of a client application with respect to confidential information. Analyzing the behavior of the client application may include detecting operations of the client application on data that includes confidential information and/or identifying a pattern of how the client application uses confidential data. The client device assigns a rating indicative of risk to the client application based on the behavior of the client application. The rating may be a risk rating, a security rating, or some other rating indicative of risk. The rating may be assigned based on one or more operations that the client application has performed on data that includes confidential information and/or based on the pattern of how the client application uses confidential information. The client device performs one or more actions to mitigate risk of data loss if the rating exceeds a threshold. The performed actions may include quarantining the client application, blocking access (e.g., network access) to the client application, terminating the client application, notifying a system administrator of the client application, requesting a detailed scan of the client application, and so on.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing", "detecting", "performing", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of an exemplary network architecture 100, in which embodiments of the present invention may operate. The architecture 100 includes a server 102 coupled to clients 106 via a private network 104. The private network 104 may be a local area network (LAN), wide area network (WAN), metropolitan area network (MAN), etc. The private network in one embodiment is connected with a public network 115 such as the Internet. In one embodiment, the private network 104 is separated from the public network 115 by a firewall (not shown).

Each client 106 may be a personal computer (PC), a laptop, a mobile phone, a server, or any other computing device. One or more clients 106 may host a client-based malware prevention system (MPS) 112 that monitors operations of client applications 110. A client application 110 is an application that runs on the client 106. The client-based MPS 112 monitors operations of the applications 110 that store, transform and/or transmit data, as well as other operations on data.

In one embodiment, the client-based MPS 112 includes a file system monitor 130 to monitor operations that are performed via a file system. In one embodiment, the file system monitor 130 includes a file system hook that intercepts commands to access, store, modify, etc. files stored remotely on network storage 108 and locally on local storage 120. The file system monitor 130 may also include one or more drivers (e.g., file system filter drivers, device drivers, etc.) and/or kernel modules. For example, the file system monitor 130 may include one or more file system filter drivers that can determine which applications 110 start or stop executing (e.g., by intercepting OS calls for process creation or deletion), and that can identify I/O requests (including the file being accessed, the application accessing the file, an indication as to whether the file being accessed is stored on a remote or local storage device, etc.) of executing applications 110.

In one embodiment, the client-based MPS 112 includes a network monitor 135 to monitor operations that are performed by a client application 110 over the private network 104. The network monitor 135 inspects network communications such as email, instant messages, web traffic (e.g., via hypertext transport protocol (HTTP)), file transfer protocol (FTP) traffic, point-to-point (P2P) traffic, generic transmission control protocol/internet protocol (TCP/IP) traffic, and so on. In one embodiment, the network monitor 135 includes a network analyzer for monitoring network communications. In one embodiment the network analyzer includes a packet analyzer and/or packet sniffer.

When either the file system monitor 130 or the network monitor 135 detects an operation on data, the client-based MPS 112 analyzes the data to determine whether the data contains confidential information. If the data does contain confidential information, then the client-based MPS 112 performs a behavioral analysis on the application 110 performing the operation to determine whether that application 110 may be designed to steal confidential information. If, based on the behavioral analysis, the client-based MPS 112 determines that the application 110 is or may be malware, then the client-based MPS 112 implements one or more policies to mitigate the risk posed by the application 110. The client-based MPS 112 is discussed in greater detail below with reference to FIG. 2.

In one embodiment, the client-based MPS 112 reports the violation of the policies to a sever based MPS 114 hosted by server 102. Such reports may be sent in real-time, periodically, based on some administrator designed trigger, etc.

Server 102 may be any computing device capable of communicating with clients 106 and performing operations described herein. Server-based MPS 114 defines data loss prevention (DLP) policies for preventing leakage of confidential information and/or malware policies for the prevention and removal of malware such as viruses, Trojan horses, worms, and so forth. Based on the DLP policies and malware policies, the server-based MPS 114 monitors traffic (e.g., email messages, text messages, web requests, etc.) incoming to, and outgoing from, the clients 106 to determine whether any transmitted content includes confidential information protected by the DLP policies, and whether any transmitted content includes malware and/or is transmitted by malware. In one embodiment, the server-based MPS 114 performs all of the functions described with reference to the client-based MPS 112. In addition, the server-based MPS 114 receives reports from the clients 106 that identify violations of the DLP policies and malware policies that are detected on the clients 106 by client-based MPS 112. The server-based MPS 114 then takes appropriate actions with respect to the policy violations. For example, the server-based MPS 114 can report the policy violations to a system administrator, instruct client-based malware prevention systems 112 to blacklist client-based applications 110 violating the policies, etc.

In an example, assume that a client-based MPS 112 detects a client application 110 that is transmitting confidential information to a location outside the private network 104 (e.g., somewhere within public network 115). This client-based MPS 112 sends a report of the client application 110 to the server-based MPS 114. The server-based MPS 114 blacklists the client application 110, and notifies all client-based malware prevention systems 112 on the private network 104 that the client application 110 has been blacklisted. Therefore, if the application 110 spreads to other clients 106, they will automatically take measures to mitigate any risk that the application 110 will steal confidential information.

Figure 2:
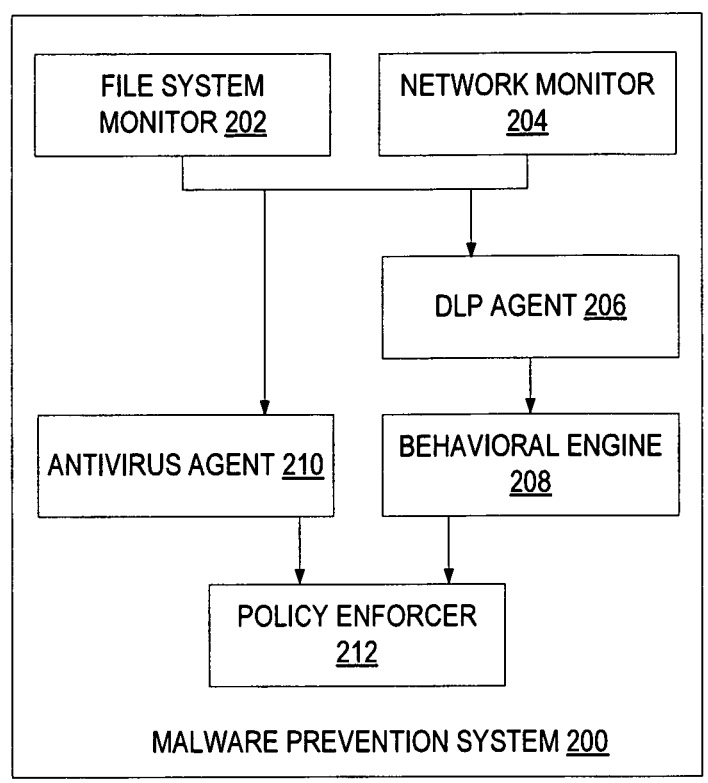
FIG. 2 is a block diagram of one embodiment of a client malware prevention system (MPS).

FIG. 2 is a block diagram of one embodiment of a client and/or server malware prevention system (MPS) 200. The client MPS 200 in one embedment includes a file system monitor 202, a network monitor 204, a data loss prevention (DLP) agent 206, a behavioral engine 208, an antivirus agent 210 and a policy enforcer 212. Alternatively, the MPS 200 may include a subset of these components. In another embodiment, the malware prevention system 200 includes a data loss prevention (DLP) agent 206, a behavioral engine 208, an antivirus agent 210 and a policy enforcer 212. In such an embodiment, the DLP agent 206 and antivirus agent 210 may each include a distinct network monitor (not shown) and file system monitor (not shown). In one embodiment, the file system monitor 202 and network monitor 204 operate as described above with reference to file system monitor 130 and network monitor 135 of FIG. 1. In one embodiment, the MPS 200 corresponds to client-based MPS 112 of FIG. 1. In another embodiment, the MPS 200 corresponds to server-based MPS 114 of FIG. 1.

The DLP agent 206 receives reports identifying operations on data from the file system monitor 202 and/or the network monitor 204 whenever the file system monitor 202 or network monitor 204 detect such operations. Operations on data include communications (e.g., IM, FTP, email, etc.), file system operations (e.g., read operations, write operations, etc.), operations to transform data (e.g., to compress or encrypt data), and so on. The DLP agent 206 analyzes all identified operations on data by scanning the contents of the data to determine whether the data contains confidential information. For example, the DLP agent 206 may identify whether data contains social security numbers, credit card numbers, and so on. If the DLP agent 206 detects an operation on data that includes confidential information, it notifies the behavioral engine 208 of the operation. In one embodiment, the notification includes an identification of what confidential data was operated on. The notification may also include an identification of the amount of confidential information, the application performing the operation, the type of operation, etc.). If the scanning shows that the data does not include confidential information protected by a DLP policy, the DLP agent 206 ignores the operation.

The behavioral engine 208 is a heuristic engine that determines whether applications are using confidential data for legitimate or illegitimate purposes. The behavioral engine 208 analyzes detected usage of confidential information, and compares this usage to one or more usage models or profiles. If the usage is similar to a usage signature of malware, then in one embodiment the behavioral engine 208 assigns a high risk rating to the application. In another embodiment, a low security rating may be assigned if the usage is similar to a usage signature of malware. Alternatively, some other appropriate rating value that is indicative of a high risk may be assigned if another rating system is used.

In one embodiment, the behavioral engine 208 profiles the activities of trusted applications and/or other legitimate applications to develop a model or models of legitimate and illegitimate usage of confidential information. Behavioral engine 208 may also profile the activities of malware applications, such as crimeware, that are designed to steal or otherwise misuse confidential information. In one embodiment, behavioral engine 208 is preprogrammed with one or more profiles of legitimate and/or malware applications and/or models based on such profiles.

Profiles of legitimate applications identify different types of benign behavior. For example, a profile of a word processing application may include a few read and write operations to data that includes confidential information if a user normally uses the word processing application to open and/or write a few documents containing confidential information a day. The profile may also include an even distribution of folders from which files are accessed, and other characteristics of standard word processor activity. If the behavioral engine 208 detects an application that is reading and writing dozens of documents that include confidential information in a day, this may raise an alarm based on the profile and/or a model that includes the profile.

In one embodiment, at least some legitimate application profiles are based on patterns of how users access email, access files, send email, move confidential data across endpoints, etc. The behavioral engine 208 considers the information accessed, how the data is being accessed, the rate at which confidential information is being accessed, the percentage of data that is being accessed that contains confidential information, etc. Behavioral engine 208 may also consider the types of files being operated on, how recently the files being operated on were modified, and/or whether an application is reading an entire file or just examining metadata.

In the case of intercepted communications, the behavioral engine 208 examines where the client application is moving data to (e.g., whether it is attempting to transmit data to a location that is external to a private network on which the client hosting the local application resides).

In the case of intercepted commands to transform data, the behavioral engine 208 determines whether the client application is attempting to manipulate data in such a way to conceal the confidential information, such as compressing or encrypting the data. The behavioral engine may also look at whether the application is copying confidential data to a container (e.g., a protected container). If data with confidential information is transformed, then the behavioral engine may generate a flag for the transformed data indicating that it contains confidential information. Therefore, it may be easier to later determine that the transformed data contains confidential information.

In the case of intercepted commands for file system operations, the behavioral engine 208 may consider the location from which the confidential information was read and/or the location to which it is saved. The behavioral engine 208 may also consider the locations of data frequently operated on by the client application and/or the locations of data frequently operated on by other applications. For example, if the application only attempts to access data that is stored in locations that are more likely to include confidential information (e.g., the My Documents folder in Windows, specific network locations, etc.), then a likelihood that the application is malware is increased. Additionally, different locations (e.g., directories) may only be accessible to certain applications and/or user accounts. Behavioral engine 208 may consider whether the application is accessing confidential information that it is not entitled to access, whether the application is running from a user account that is not entitled to access the confidential information.

In one embodiment, the behavioral engine examines characteristics and statistics of the application itself to better determine whether the application is malware. For example, behavioral engine 208 may consider how many clients include an application. Enterprise approved applications will typically be present on many clients, while at least some types of malware applications have a tendency to only be present on a few clients.

In one embodiment, the behavioral engine 208 examines circumstances surrounding the application's attempt to perform an operation on confidential information. For example, the behavioral engine 208 may determine whether a user is present on the client when the confidential information is being accessed (e.g., based on keyboard and mouse activity), whether the user was directing the application to perform the operation, or whether the application performed the operation without user involvement.

In one embodiment, for applications that include plugins and/or extensions, the behavioral engine 208 separately monitors the behavior of each plugin and/or extension. For example, Internet Explorer by Microsoft, Inc. often includes a variety of plugins, some of which may be browser helper objects (BHOs) that are designed to steal confidential information. The behavioral engine 208 may separately identify the BHOs, and assign high risk ratings to them, while assigning low risk ratings to legitimate plugins such as a pdf reader or Quicktime media player.

In one embodiment, before the behavioral engine 208 assigns a risk rating to an application, the behavioral engine 208 determines whether the application is a trusted application. A trusted application is an application that has been verified as a legitimate application by a security certificate authority such as Verisign. Trusted applications may include office suite applications (e.g., Microsoft® Word®, Open Office, etc.), file manager programs (e.g., Windows® Explorer®, Universal Explorer®, etc.), command line interpreter programs (e.g., Windows® PowerShell®, Unix Shell, etc.), or any other known commercial applications. Applications that are not trusted applications may be internal applications developed in house by an enterprise, malware, or other unknown applications. In one embodiment, the behavioral engine 208 determines whether an application is a trusted application by examining a certificate of the application that has been signed by a security certificate authority such as Verisign.

In one embodiment, the behavioral engine 208 maintains records of each of the client applications. As a client application performs more operations, a more accurate determination of the threat posed by the client application can be made. In one embodiment, the behavioral engine 208 assigns a high risk rating to newly identified applications upon first detecting them performing operations on confidential data. This risk rating may later be lowered as the application performs additional operations that are not suspicious, or after an administrator indicates that the application is not malware. In another embodiment, the behavioral engine 208 initially assigns a low risk rating, and increases the risk rating as the application is detected to exhibit additional suspicious behavior.

In one embodiment, the behavioral engine 208 determines that it needs to generate a new profile based on the behavior of the application, and generates a new profile. The new profile may be a new profile of a malicious application or a new profile of a benign application. The new profile may be used to update a model of legitimate and/or illegitimate usage of confidential information. As the number of profiles increases, and the amount of information available to generate and refine the profiles increases, the behavioral engine can improve the effectiveness of distinguishing legitimate applications from malware applications.

In one embodiment, antivirus agent 210 receives information on the activities of applications from file system monitor 202 and/or network monitor 204. The information may include information on operations performed by applications on data and/or other activities of the application. The antivirus agent 210 includes a malware detector (not shown) that uses a signature based malware detection engine and/or a heuristic malware detection engine. The signature based malware detection engine may determine whether the application performing the operation is known malware for which a signature has been created. The heuristic based malware detection engine monitors behavior of the application with regards to how it interacts with an operating system hosting the MPS 200. The heuristic malware detection engine identifies processes opened by the application, whether the application modifies registry keys, hooks APIs, injects code, or performs other process or operating system related activities. The heuristic malware detection engine looks at activities related to processes, and is not data content aware. The heuristic malware detection engine in one embodiment generates a risk rating that is distinct from the risk rating calculated by the behavioral engine.

In one embodiment, the behavioral engine 208 is integrated into the antivirus agent 210. The behavioral engine 208 may be separate from the heuristic malware detection engine of the antivirus agent 210, or the heuristic malware detection engine may be modified to include the functionality of the behavioral engine 208.

The policy enforcer 212 receives threat assessment information (e.g., risk ratings) from the behavioral engine 208 and/or antivirus agent 210. The policy enforcer 212 includes one or more policies for preventing malware from stealing confidential information. The policy enforcer 212 determines whether any of the policies indicate that actions should be taken based on the reported threat level of the application. In one embodiment, the policy enforcer 212 considers both the risk ratings received from the antivirus agent 210 and from the behavioral engine 208 when determining whether any policies have been violated. Alternatively, the policy enforcer 212 considers only the risk rating provided by the behavioral engine 208. Actions that may be taken by the policy enforcer include blacklisting the client application, blocking network access to the client application, terminating the client application, notifying an administrator of the client application, and so on.

Figure 3:
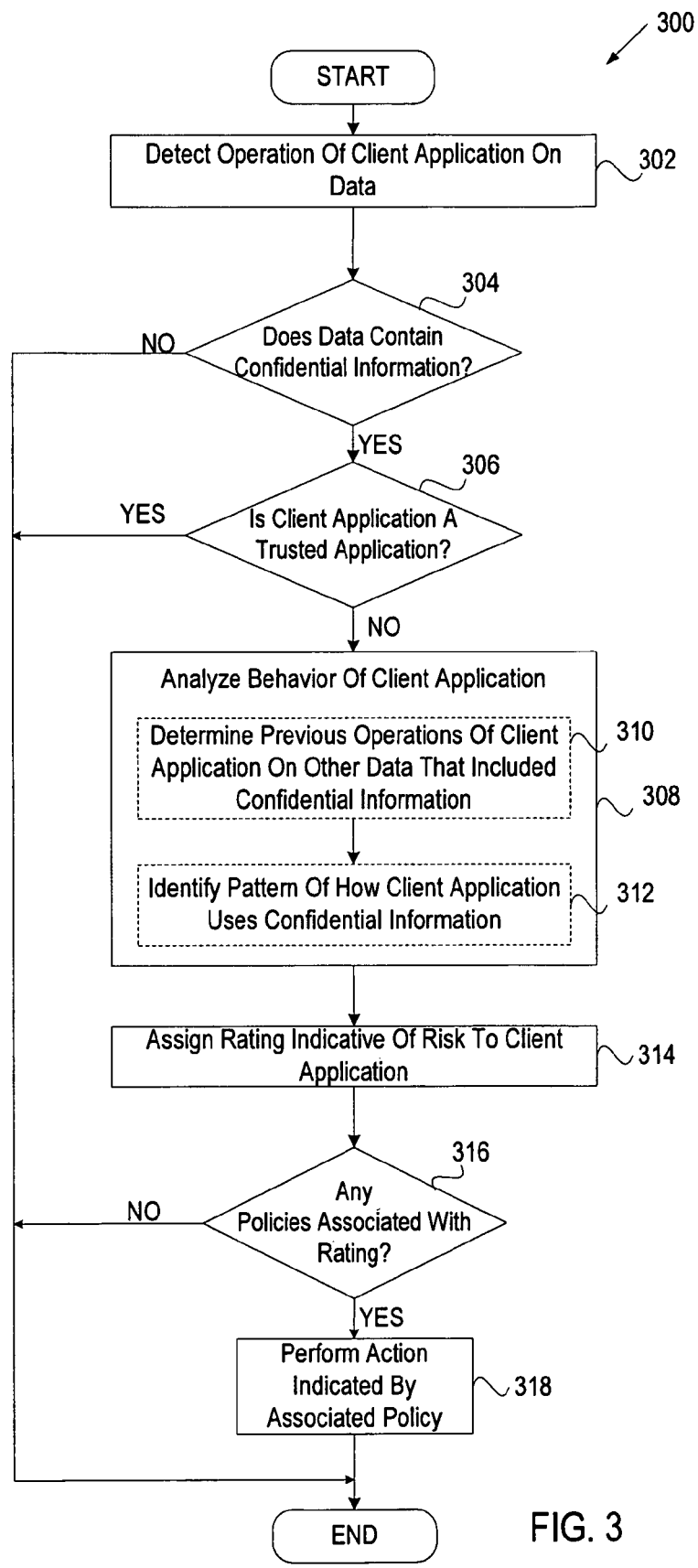
FIG. 3 is a flow diagram of one embodiment of a method for preventing malware from stealing confidential information.

FIG. 3 is a flow diagram of one embodiment of a method 300 for preventing malware from stealing confidential information. The method 300 is performed by processing logic that may comprise hardware (circuitry, dedicated logic, etc.), software (such as is run on a general purpose computer system or a dedicated machine), or a combination of both. The method 300 may be performed by a malware prevention system hosted by a client device or server (e.g., malware prevention system 200 of FIG. 2).

Referring to FIG. 3, processing logic begins with detecting an operation of a client operation on data at block 302. The operation may be an operation to save the data to a local or network storage, transmit the data, transform the data (e.g., compress or encrypt the data), etc.

At block 304, a malware prevention system scans the data to determine whether it contains any confidential information. If the data does not contain any confidential information, then the method ends. If the data does contain confidential information, the method proceeds to block 306.

At block 306, the malware prevention system determines whether the client application is a trusted application. In one embodiment, this determination is made by checking a digital certificate of the client application. If the client application has a digital certificate signed by a security authority, then the client application is a trusted application. If the client application is not a trusted application, the method continues to block 308. In one embodiment, if the client application is a trusted application, the method ends. Alternatively, if the client application is a trusted application, the method may still continue to block 308. For example, some trusted applications are known to have security flaws that enable malware to easily infest the trusted application. An example is the internet explorer application provided by Microsoft, Inc, which is fairly easy to infect with browser helper objects (BHOs) or other injectable code. In one embodiment, if the trusted application is known to have such security flaws, the method will continue to block 308.

At block 308, the malware prevention system analyzes the behavior of the client application that performed the operation. In one embodiment, the malware prevention system maintains a record of operations performed by the client application. The record may include a record of both operations on data that does not contain confidential information and on data that does contain confidential information, or may only include a record of those operations that were on data that included confidential information.

In one embodiment, the malware prevention system determines previous operations of the client application on other data that included confidential information (block 310). The malware prevention system can then identify a pattern of how the client application uses confidential information (block 312). Based on current and historical use of confidential information by the client application, at block 314 the malware prevention system assigns a rating indicative of risk to the client application. In one embodiment, the malware prevention system assigns a risk rating to the client application. A low risk rating indicates that the application poses a low risk, and a high risk rating indicates that the application poses a high risk. In another embodiment, the malware prevention system assigns a security rating to the client application. A low security rating indicates that the application poses a high risk and a high security rating indicates that the application poses a low risk. Other types of ratings that are indicative of risk posed by the client application may also be used.

The assigned rating depends on the type of operations performed on the confidential information, the frequency with which the client application performs operations on confidential information, the amount of confidential information that the client application has performed operations on, etc. For example, if a client application has stored a lot of confidential information to disk, a rating indicative of a high risk (e.g., a high risk rating) might be assigned to the application. Alternatively, if the client application has transferred just one or a few documents that contain confidential information to a server outside of a private network (e.g., to a server known to host malicious software), then a rating indicative of a high risk may also be applied.

At block 316, the malware prevention system determines whether there are any policies that are associated with the calculated rating. If there are policies that are associated with the calculated rating, the method proceeds to block 618 and actions indicated by those policies are performed. Such actions may include blacklisting the client application, blocking network access to the client application, terminating the client application, notifying an administrator of the client application, etc. If there are no policies associated with the calculated rating (e.g., if a risk rating is assessed to be a zero), then the method ends without any actions being performed.

Figure 4:
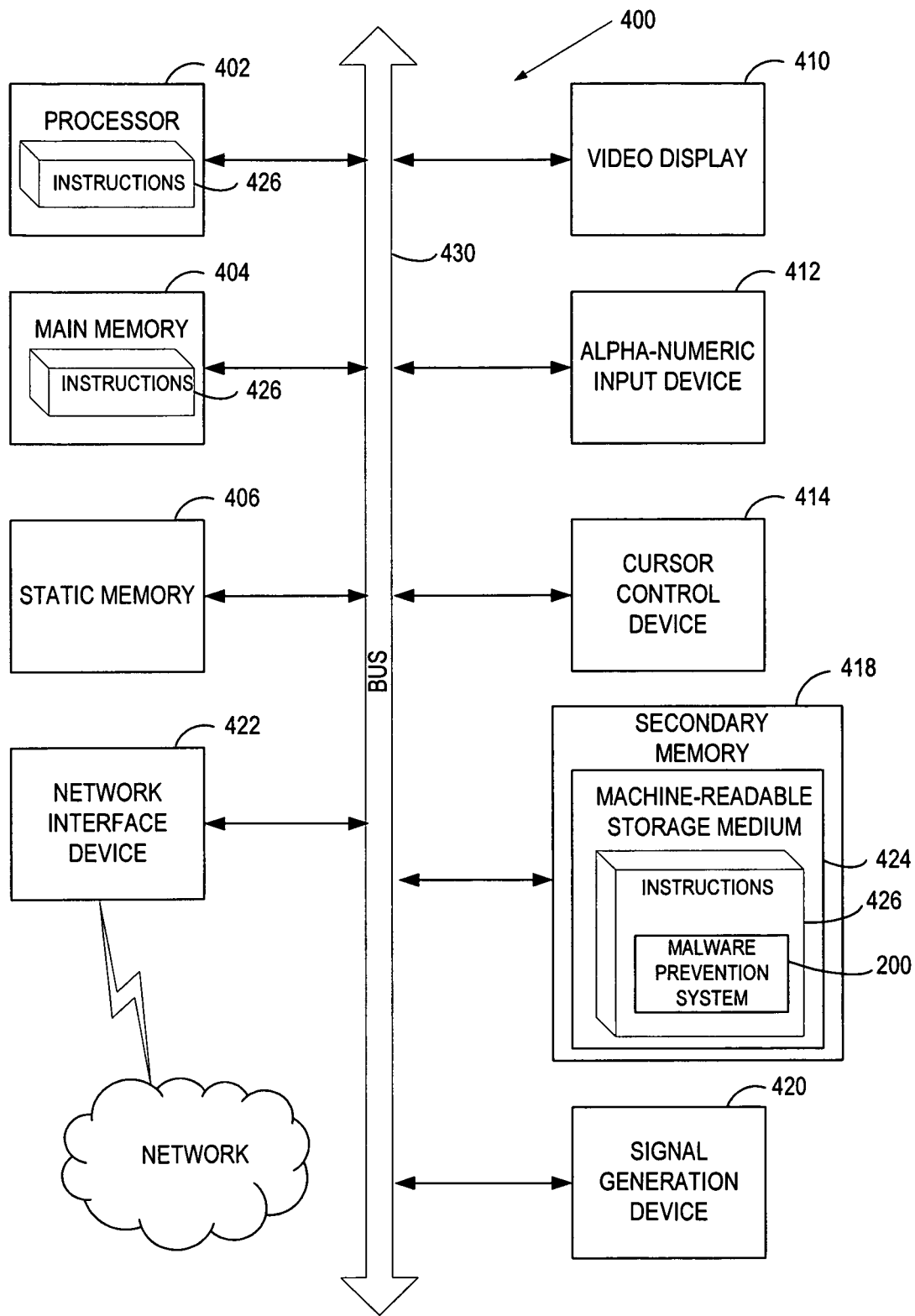
FIG. 4 is a block diagram of an exemplary computer system that may perform one or more of the operations described herein.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions 426 (e.g., processing logic) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 418 may include a machine-readable storage medium (or more specifically a computer-readable storage medium) 424 on which is stored one or more sets of instructions 426 (e.g., software) embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

The machine-readable storage medium 424 may also be used to store the user malware prevention system 200 of FIG. 2, and/or a software library containing methods that call the malware prevention system. While the machine-readable storage medium 424 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A computer-implemented method comprising:
monitoring, by a computing device, operations by a client application;
determining, by the computing device, that data of one of the operations contain confidential information protected by a data loss prevention (DLP) policy; and
in response to determining that the data contains the confidential information, determining whether the client application is using the confidential information for a legitimate purpose or an illegitimate purpose, comprising:
analyzing, by the computing device, behavior of the client application with respect to the confidential information;
identifying a pattern of how the client application uses the confidential information based at least in part on the behavior of the client application, wherein the identified pattern is not associated with a user;
performing a comparison of the identified pattern to at least one of a model of legitimate use of the confidential information or a model of illegitimate use of the confidential information to determine a security risk of the client application; and
assigning a risk rating indicative of the security risk to the client application;
performing an action to mitigate risk of data loss if the risk rating exceeds a threshold.

2. The computer-implemented method of claim 1, further comprising
assigning the risk rating to the client application based on at least one of the detected operation and one or more previous operations of the client application on additional data that includes the confidential information.

3. The computer-implemented method of claim 2, wherein a first risk rating that exceeds the threshold is assigned to the client application upon detecting the operation on the data that includes the confidential information, the method further comprising:
modifying the first risk rating assigned to the client application if no additional operations of the client application on data that includes the confidential information are detected within a specified time frame.

4. The method of claim 2, wherein the detected operation comprises at least one of an operation to store the data, an operation to transform the data or an operation to transmit the data to a destination outside of an enterprise network within which the computing device operates.

5. The computer-implemented method of claim 1, further comprising assigning the risk rating only if the client application is not a trusted client application.

6. The computer-implemented method of claim 1, wherein performing the action comprises:
at least one of quarantining the client application, blocking access to the client application or terminating the client application if a first risk rating is assigned to the client application; and
at least one of notifying a system administrator of the client application or requesting a detailed scan of the client application if a second risk rating is assigned to the client application.

7. The computer-implemented method of claim 1, further comprising:
profiling activities of one or more legitimate applications to develop the model of legitimate use of the confidential information; and
profiling activities of one or more illegitimate applications to develop the model of illegitimate use of the confidential information.

8. A non-transitory computer-readable storage medium including instructions that, when executed by a computing device, cause the computing device to perform operations comprising:
monitoring, by the computing device, operations by a client application;
determining, by the computing device, that data of one of the operations contain confidential information protected by a data loss prevention (DLP) policy; and
in response to determining that the data contains the confidential information, determining whether the client application is using the confidential information for a legitimate purpose or an illegitimate purpose, comprising:
analyzing, by the computing device, behavior of the client application with respect to the confidential information;
identifying a pattern of how the client application uses the confidential information based at least in part on the behavior of the client application, wherein the identified pattern is not associated with a user;
performing a comparison of the identified pattern to at least one of a model of legitimate use of the confidential information or a model of illegitimate use of the confidential information to determine a security risk of the client application; and
assigning a rating indicative of the security risk to the client application;
performing an action to mitigate risk of data loss if the rating exceeds a threshold.

9. The non-transitory computer-readable storage medium of claim 8, the operations further comprise
assigning the rating to the client application based on at least one of the detected operation and one or more previous operations of the client application on additional data that includes the confidential information.

10. The non-transitory computer-readable storage medium of claim 9, wherein a first rating that exceeds the threshold is assigned to the client application upon detecting the operation on the data that includes the confidential information, the operations further comprise
reducing the first rating assigned to the client application if no additional operations of the client application on data that includes the confidential information are detected within a specified time frame.

11. The non-transitory computer-readable storage medium of claim 9, wherein the detected operation comprises at least one of an operation to store the data, an operation to transform the data or an operation to transmit the data to a destination outside of an enterprise network within which the computing device operates.

12. The non-transitory computer-readable storage medium of claim 8, the operations further comprise
assigning the rating only if the client application is not a trusted client application.

13. The non-transitory computer-readable storage medium of claim 8, wherein performing the action comprises:

at least one of quarantining the client application, blocking access to the client application or terminating the client application if a first rating is assigned to the client application; and at least one of notifying a system administrator of the client application or requesting a detailed scan of the client application if a second rating is assigned to the client application.

14. The non-transitory computer-readable storage medium of claim 8, the operations further comprise:

profiling activities of one or more legitimate applications to develop the model of legitimate use of the confidential information; and profiling activities of one or more illegitimate applications to develop the model of illegitimate use of the confidential information.

15. A computing apparatus comprising:

a memory to store instructions for a behavioral engine; and a processor, connected with the memory, to execute the instructions, wherein the instructions cause the processor to:

monitor operations by a client application by a data loss prevention (DLP) agent;

determine by the DLP agent that data of one of the operations contain confidential information protected by a data loss prevention (DLP) policy; and in response to determining that the data contains the confidential information, notify a behavior engine to determine whether the client application is using the confidential information for a legitimate purpose or an illegitimate purpose, comprising:

analyze, by the behavior engine, behavior of a client application with respect to confidential information;

identify, by the behavior engine, a pattern of how the client application uses the confidential information based at least in part on the behavior of the client application, wherein the identified pattern is not associated with a user;

perform, by the behavior engine, a comparison of the identified pattern to at least one of a model of legitimate use of the confidential information or a model of illegitimate use of the confidential information to determine a security risk of the client application;

assign, by the behavior engine, a rating indicative of the security risk to the client application; and perform, by the DLP agent, an action to mitigate risk of data loss if the rating exceeds a threshold.

16. The computing apparatus of claim 15, wherein the instructions further cause the processor to assign the rating to the client application based on at least one of the detected operation and one or more previous operations of the client application on additional data that includes the confidential information.

17. The computing apparatus of claim 16, wherein a first rating that exceeds the threshold is assigned to the client application upon detecting the operation on the data that includes confidential information, the instructions further to cause the processor to reduce the first rating assigned to the client application if no additional operations of the client application on data that includes the confidential information are detected within a specified time frame.

18. The computing apparatus of claim 16, wherein the detected operation comprises at least one of an operation to store the data, an operation to transform the data or an operation to transmit the data to a destination outside of an enterprise network within which the computing apparatus operates.

19. The computing apparatus of claim 15, wherein the instructions further cause the processor to assign the rating only if the client application is not a trusted client application.

20. The computing apparatus of claim 15, wherein the instructions further cause the processor to:

profile activities of one or more legitimate applications to develop the model of legitimate use of the confidential information; and profile activities of one or more illegitimate applications to develop the model of illegitimate use of the confidential information.

* * * * *